(12) United States Patent  
Johnson

(10) Patent No.: US 9,308,880 B1
(45) Date of Patent: Apr. 12, 2016

(54) BUMPER PROTECTION DEVICE FOR AN AUTOMOBILE

(71) Applicant: Darius Johnson, Brooklyn, NY (US)

(72) Inventor: Darius Johnson, Brooklyn, NY (US)

(*) Notice: Subject to any disclaimer, the term of this patent is extended or adjusted under 35 U.S.C. 154(b) by 0 days.

(21) Appl. No.: 14/794,510

(22) Filed: Jul. 8, 2015

(51) Int. Cl.
| | |
|---|---|
| *B60R 19/46* | (2006.01) |
| *B60R 19/38* | (2006.01) |
| *B60R 19/14* | (2006.01) |
| *B60R 21/01* | (2006.01) |
| *B60R 19/02* | (2006.01) |

(52) U.S. Cl.
CPC .............. *B60R 19/38* (2013.01); *B60R 19/023* (2013.01); *B60R 19/14* (2013.01); *B60R 21/01* (2013.01); *B60R 2021/01286* (2013.01)

(58) Field of Classification Search
CPC ........ B60R 19/38; B60R 19/40; B60R 19/42; B60R 19/44; B60R 19/46; B60R 19/54
USPC .................... 293/142–145, 128, 118
See application file for complete search history.

(56) References Cited

U.S. PATENT DOCUMENTS

| | | | |
|---|---|---|---|
| 3,718,357 A | | 2/1973 | Hertzell |
| 4,217,715 A | * | 8/1980 | Bryan, Jr. ................. B60R 13/00 293/118 |
| 6,572,163 B1 | * | 6/2003 | Pickett .................... B60R 19/44 293/142 |
| 6,575,509 B1 | | 6/2003 | Golden |
| 7,354,083 B1 | | 4/2008 | Obermann |
| 8,146,935 B1 | * | 4/2012 | Adams ....................... B60R 3/02 280/164.1 |
| 2008/0061566 A1 | * | 3/2008 | Ryan ....................... B60R 19/38 293/118 |
| 2010/0276951 A1 | * | 11/2010 | Malina .................... B60R 19/44 293/142 |

* cited by examiner

*Primary Examiner* — Dennis H Pedder
(74) *Attorney, Agent, or Firm* — Crossley & Stevenson IP Law

(57) ABSTRACT

A bumper protection device for an automobile including a parallel track mounted to an underside of an automobile, a bumper shield continuously disposed atop the parallel track, a pair of spring loaded hinges, a linear actuator, a central processing unit, and a power connector. The bumper shield has an extended position and an alternate retracted position. The central processing unit is configured to activate the linear actuator to transport the bumper shield along the parallel track to the extended position when a user selectively engages an automobile in a parking gear. The central processing unit is configured to activate the linear actuator to transport the bumper shield along the parallel track to the retracted position when the user selectively engages the automobile from the parking gear to an alternate gear.

4 Claims, 5 Drawing Sheets

BUMPER PROTECTION DEVICE FOR AN AUTOMOBILE

BACKGROUND OF THE INVENTION

Various types of bumper devices are known in the prior art. However, what has been needed is a bumper protection device for an automobile including a parallel track mounted to an underside of an automobile, a bumper shield continuously disposed atop the parallel track, a pair of spring loaded hinges, a linear actuator, a central processing unit, and a power connector. What has also been needed is for the bumper shield to have an extended position and an alternate retracted position. The bumper shield and the parallel track are perpendicularly disposed, and the bumper shield is proximally disposed substantially parallel to a bumper of the automobile proximal the front end of the automobile and, alternately, proximal the back end of the automobile when the bumper shield is in the extended position. The bumper shield is in the retracted position when the bumper shield is disposed below the underside of the automobile on the parallel track. The bumper protection device for an automobile, which can be sized to fit any automobile bumper, helps to protect both a front bumper and a rear bumper of an automobile from scratches, dents, and scrapes as a result of parking the automobile on a street or in a parking garage. Furthermore, the bumper protection device for an automobile is configured to automatically extend the bumper shield to protect the bumper as soon as a driver places the car in a parking gear, which saves the driver the time, frustration, and energy of either having to manually cover the bumper with another protective device or to remember each time that the car is parked to put such a device on the bumper.

FIELD OF THE INVENTION

The present invention relates to bumper devices, and more particularly, to a bumper protection device for an automobile.

SUMMARY OF THE INVENTION

The general purpose of the present bumper protection device for an automobile, described subsequently in greater detail, is to provide a bumper device which has many novel features that result in a bumper protection device for an automobile which is not anticipated, rendered obvious, suggested, or even implied by prior art, either alone or in combination thereof.

To accomplish this, the present bumper protection device for an automobile includes a parallel track, a bumper shield, a pair of spring loaded hinges, a linear actuator, a central processing unit, and a power connector. The parallel track includes a first track and a second track. The first track and the second track are mounted to an underside of an automobile proximal a front end of the automobile and, alternately, proximal a back end of the automobile. Each of the first track and the second track has a front edge and a back edge. The bumper shield is continuously disposed atop the parallel track. The bumper shield has a top surface, a bottom surface, a front end, a back end, a right side, and a left side. The first track is configured to engage the top surface of the bumper shield proximal the right side. The second track is configured to engage the top surface of the bumper shield proximal the left side. A length of the bumper shield substantially conforms to a length of the back end of the automobile and, alternately, a length of the front end of the automobile.

The pair of spring loaded hinges includes a first spring loaded hinge and a second spring loaded hinge. Each of the first spring loaded hinge and the second spring loaded hinge is attached to the back end of the bumper shield proximal the right side and the back end of the bumper shield proximal the left side, respectively. The linear actuator is attached to the parallel track. The linear actuator is configured to horizontally transport the bumper shield along the parallel track. The central processing unit is disposed within the automobile. The power connector has a right end and a left end. Each of the right end and the left end is attached to the linear actuator and a power source within the automobile, respectively. The central processing unit, the linear actuator, and the power source are in operational communication with each other.

The bumper shield has an extended position and an alternate retracted position. The bumper shield is in the extended position when each of the first spring loaded hinge and the second spring loaded hinge is disposed proximal the front edge of each of the first track and the second track, respectively. The bumper shield and the parallel track are perpendicularly disposed, and the bumper shield is proximally disposed substantially parallel to a bumper of the automobile proximal the front end and, alternately, proximal the back end when the bumper shield is in the extended position. A width of the bumper shield substantially conforms to a width of the bumper on the automobile. The bumper shield is in the retracted position when the bumper shield is disposed below the underside of the automobile on the parallel track.

The central processing unit is configured to activate the linear actuator to transport the bumper shield along the parallel track to the extended position when a user selectively engages the automobile in a parking gear. The central processing unit is configured to activate the linear actuator to transport the bumper shield along the parallel track to the retracted position when the user selectively engages the automobile from the parking gear to an alternate gear.

The bumper protection device for an automobile optionally further comprises a compressible covering and a plurality of light emitting diodes. The compressible covering is continuously disposed on the top surface of the bumper shield. The plurality of light emitting diodes is disposed on the bottom surface of the bumper shield.

Thus has been broadly outlined the more important features of the present bumper protection device for an automobile so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 4 thereof, an example of the instant bumper protection device for an automobile employing the principles and concepts of the present bumper protection device for an automobile and generally designated by the reference number 10 will be described.

Figure 1:
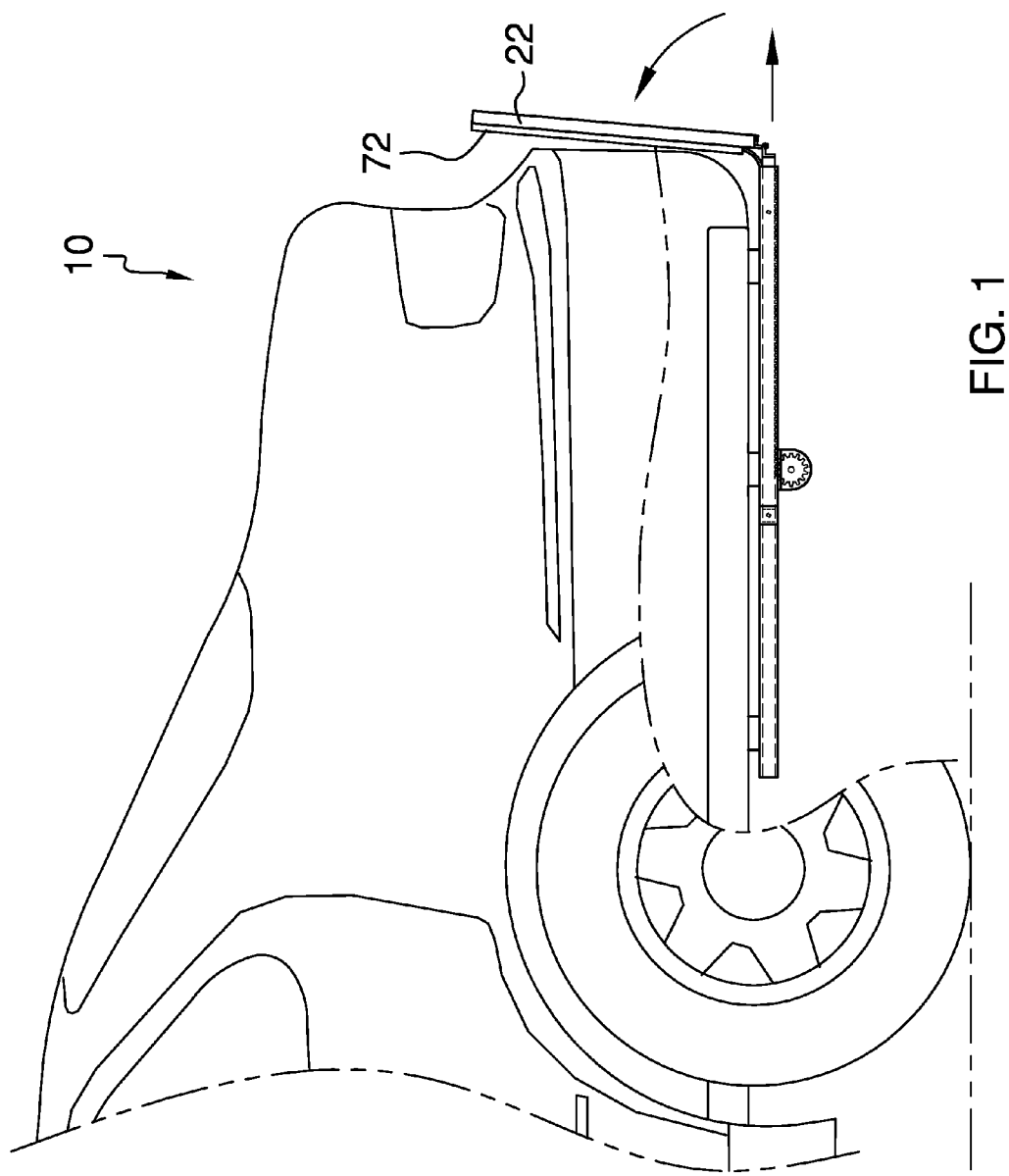
FIG. 1 is a side elevation view showing a bumper shield in an extended position.
Figure 2:
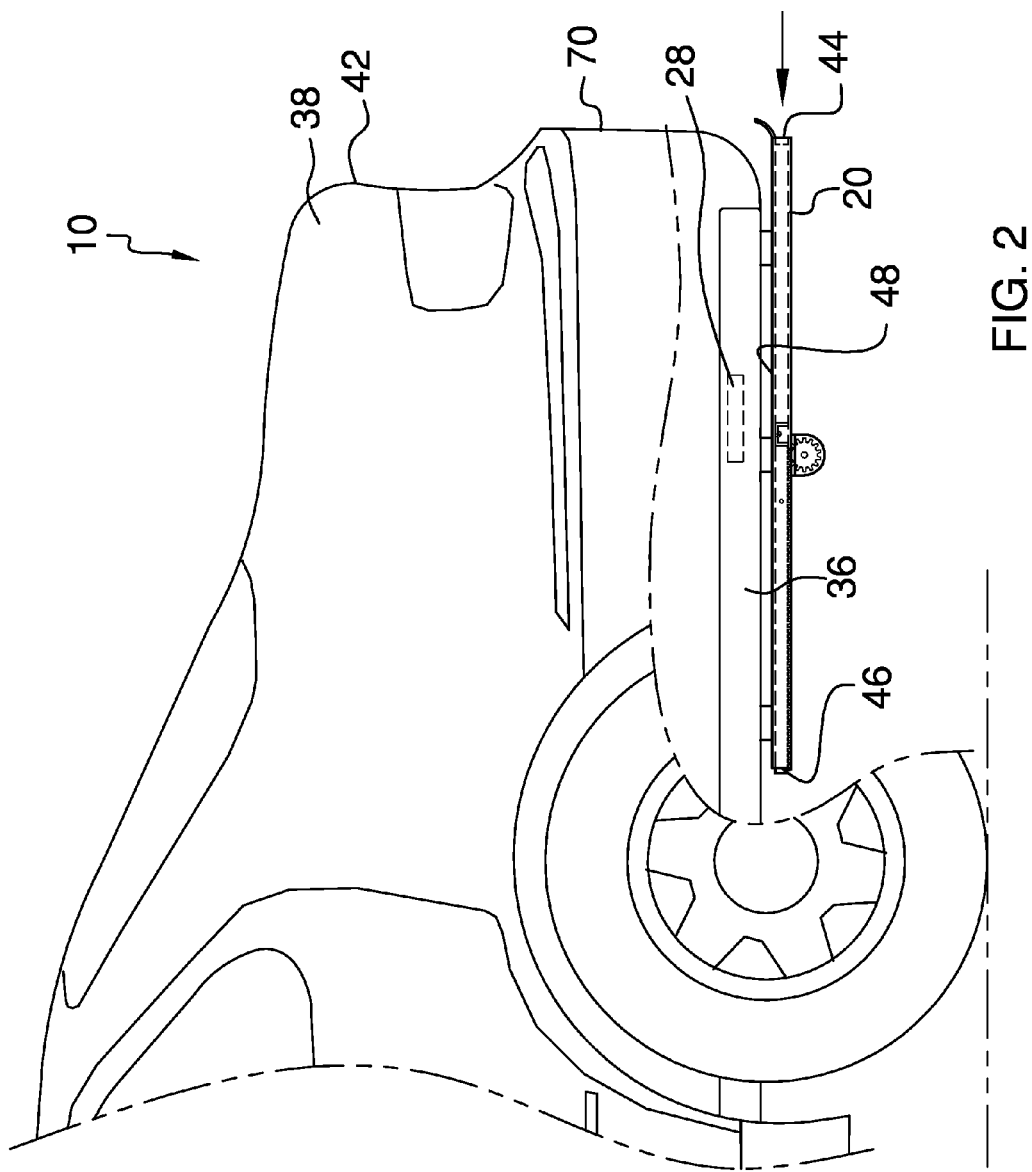
FIG. 2 is a side elevation view showing the bumper shield in a retracted position.
Figure 3:
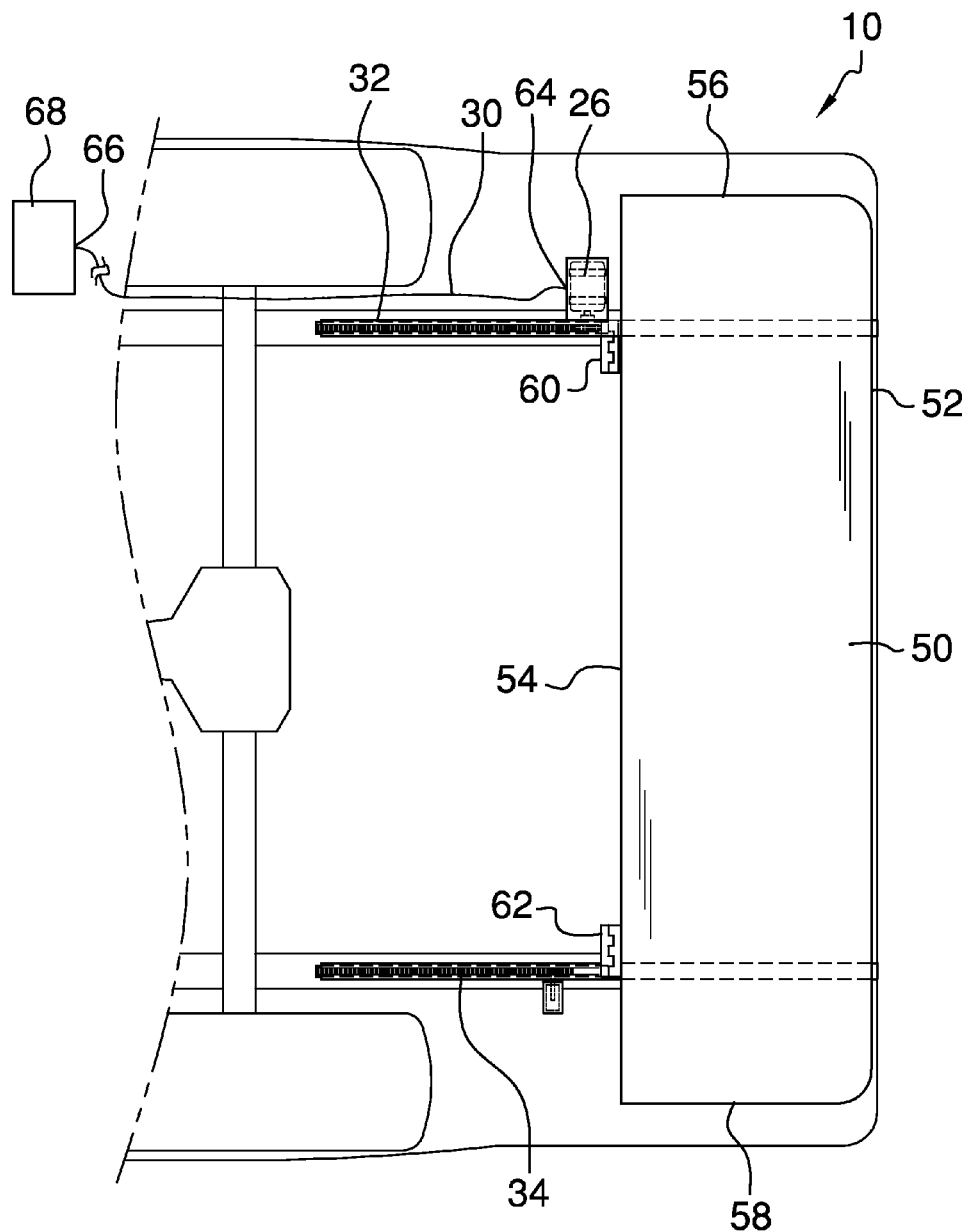
FIG. 3 is a bottom plan view.
Figure 4:
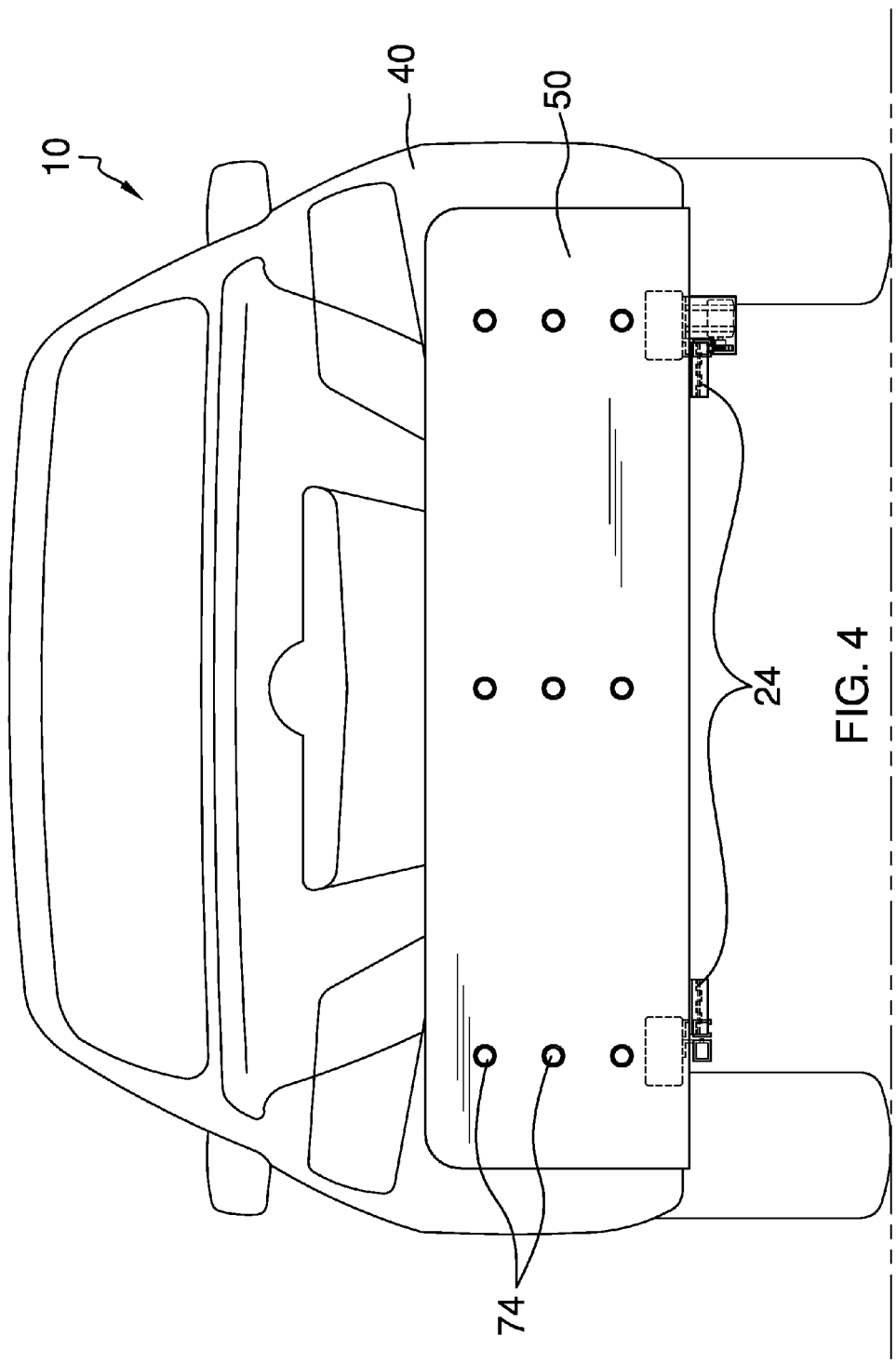
FIG. 4 is a front elevation view.
Figure 5:
FIG. 5 is a block diagram.

Referring to FIGS. 1 through 4 the present bumper protection device for an automobile 10 is illustrated. The bumper protection device for an automobile 10 includes a parallel track 20, a bumper shield 22, a pair of spring loaded hinges 24, a linear actuator 26, a central processing unit 28, and a power connector 30. As best shown in FIG. 3, the parallel track 20 includes a first track 32 and a second track 34. The first track 32 and the second track 34 are mounted to an underside 36 of an automobile 38 proximal a front end 40 of the automobile 38 and, alternately, proximal a back end 42 of the automobile 38. Each of the first track 32 and the second track 34 has a front edge 44 and a back edge 46. The bumper shield 22 is continuously disposed atop the parallel track 20. The bumper shield 22 has a top surface 48, a bottom surface 50, a front end 52, a back end 54, a right side 56, and a left side 58.

As best shown in FIG. 3, the pair of spring loaded hinges 24 includes a first spring loaded hinge 60 and a second spring loaded hinge 62. Each of the first spring loaded hinge 60 and the second spring loaded hinge 62 is attached to the back end 54 of the bumper shield 22 proximal the right side 56 and the back end 54 of the bumper shield 22 proximal the left side 58, respectively. The linear actuator 26 is attached to the parallel track 20. The central processing unit 28 is disposed within the automobile 38. The power connector 30 has a right end 64 and a left end 66. Each of the right end 64 and the left end 66 is attached to the linear actuator 26 and a power source 68 within the automobile, respectively.

As best shown in FIGS. 1 and 2, the bumper shield 22 has an extended position and an alternate retracted position. The bumper shield 22 is in the extended position when each of the first spring loaded hinge 60 and the second spring loaded hinge 62 is disposed proximal the front edge 44 of each of the first track 32 and the second track 34, respectively. The bumper shield 22 and the parallel track 20 are perpendicularly disposed, and the bumper shield 22 is proximally disposed substantially parallel to a bumper 70 of the automobile 38 proximal the front end 40 and, alternately, proximal the back end 42 when the bumper shield 22 is in the extended position. The bumper shield 22 is in the retracted position when the bumper shield 22 is disposed below the underside 36 of the automobile 38 on the parallel track 20.

The bumper protection device for an automobile 10 optionally further comprises a compressible covering 72 and a plurality of light emitting diodes 74. The compressible covering 72 is continuously disposed on the top surface 48 of the bumper shield 22. The plurality of light emitting diodes 74 is disposed on the bottom surface 50 of the bumper shield 22.

What is claimed is:

1. A bumper protection device for an automobile comprising:
    a parallel track comprising a first track and a second track, the first track and the second track mounted to an underside of an automobile proximal a front end of the automobile and alternately proximal a back end of the automobile, each of the first track and the second track having a front edge and a back edge;
    a bumper shield continuously disposed beneath the parallel track, the bumper shield having a top surface, a bottom surface, a front end, a back end, a right side, and a left side;
    wherein the first track is configured to engage the bumper shield top surface proximal the right side;
    wherein the second track is configured to engage the bumper shield top surface proximal the left side;
    a pair of spring loaded hinges comprising a first spring loaded hinge and a second spring loaded hinge, each of the first spring loaded hinge and the second spring loaded hinge attached to the bumper shield back end proximal the right side and the bumper shield back end proximal the left side, respectively;
    a linear actuator attached to the parallel track;
    wherein the linear actuator is configured to horizontally transport the bumper shield along the parallel track;
    a central processing unit disposed within the automobile; and
    a power connector having a right end and a left end, each of the right end and the left end attached to the linear actuator and a power source within the automobile, respectively;
    wherein the central processing unit, the linear actuator, and the power source are in operational communication with each other;
    wherein the bumper shield has an extended position and an alternate retracted position;
    wherein the bumper shield is in the extended position when each of the first spring loaded hinge and the second spring loaded hinge is disposed proximal the front edge of each of the first track and the second track, respectively;
    wherein the bumper shield and the parallel track are substantially perpendicularly disposed and the bumper shield is proximally disposed substantially parallel to a bumper of the automobile proximal the front end and alternately proximal the back end when the bumper shield is in the extended position;
    wherein a width of the bumper shield substantially conforms to a width of the bumper on the automobile;
    wherein the bumper shield is in the retracted position when the bumper shield is disposed below the underside of the automobile on the parallel track;
    wherein the central processing unit is configured to activate the linear actuator to transport the bumper shield along the parallel track to the extended position when a user selectively engages the automobile in a parking gear;
    wherein the central processing unit is configured to activate the linear actuator to transport the bumper shield along the parallel track to the retracted position when the user selectively engages the automobile from the parking gear to an alternate gear.

2. The bumper protection device for an automobile of claim 1 further comprising a compressible covering continuously disposed on the bumper shield top surface.

3. The bumper protection device for an automobile of claim 1 further comprising a plurality of light emitting diodes disposed on the bumper shield bottom surface.

4. A bumper protection device for an automobile comprising:
    a parallel track comprising a first track and a second track, the first track and the second track mounted to an underside of an automobile proximal a front end of the automobile and alternately proximal a back end of the automobile, each of the first track and the second track having a front edge and a back edge;
    a bumper shield continuously disposeatop beneath the parallel track, the bumper shield having a top surface, a bottom surface, a front end, a back end, a right side, and a left side;
    wherein the first track is configured to engage the bumper shield top surface proximal the right side;

wherein the second track is configured to engage the bumper shield top surface proximal the left side;
a pair of spring loaded hinges comprising a first spring loaded hinge and a second spring loaded hinge, each of the first spring loaded hinge and the second spring loaded hinge attached to the bumper shield back end proximal the right side and the bumper shield back end proximal the left side, respectively;
a linear actuator attached to the parallel track;
wherein the linear actuator is configured to horizontally transport the bumper shield along the parallel track;
a central processing unit disposed within the automobile;
a power connector having a right end and a left end, each of the right end and the left end attached to the linear actuator and a power source within the automobile, respectively;
wherein the central processing unit, the linear actuator, and the power source are in operational communication with each other;
wherein the bumper shield has an extended position and an alternate retracted position;
wherein the bumper shield is in the extended position when each of the first spring loaded hinge and the second spring loaded hinge is disposed proximal the front edge of each of the first track and the second track, respectively;
wherein the bumper shield and the parallel track are substantially perpendicularly disposed and the bumper shield is proximally disposed substantially parallel to a bumper of the automobile proximal the front end and alternately proximal the back end when the bumper shield is in the extended position;
wherein a width of the bumper shield substantially conforms to a width of the bumper on the automobile;
wherein the bumper shield is in the retracted position when the bumper shield is disposed parallel to the parallel track below the underside of the automobile;
wherein the central processing unit is configured to activate the linear actuator to transport the bumper shield along the parallel track to the extended position when a user selectively engages the automobile in a parking gear;
wherein the central processing unit is configured to activate the linear actuator to transport the bumper shield along the parallel track to the retracted position when the user selectively engages the automobile from the parking gear to an alternate gear;
a compressible covering continuously disposed on the bumper shield top surface; and
a plurality of light emitting diodes disposed on the bumper shield bottom surface.

* * * * *